UNITED STATES PATENT OFFICE.

RICHARD TAGGESELL, OF BUFFALO, NEW YORK, ASSIGNOR TO THE SCHOELLKOPF, HARTFORD & HANNA COMPANY, OF SAME PLACE.

META-AMIDOTOLYLOXAMINSULFO-ACID.

SPECIFICATION forming part of Letters Patent No. 659,497, dated October 9, 1900.

Application filed April 16, 1900. Serial No. 13,110. (Specimens.)

*To all whom it may concern:*

Be it known that I, RICHARD TAGGESELL, a subject of the King of Saxony, and a resident of Buffalo, in the county of Erie and State of New York, have invented a new and useful Improvement in Amido Compounds, of which the following is a specification.

My invention relates to the production of a new amido compound which is useful in the manufacture of dyestuffs and which I call "meta-amidotolyloxaminsulfoacid B." This new amido compound is produced, briefly stated, by heating one molecule of meta-toluylenediaminsulfoacid in a watery solution with an excess of oxalic acid, whereby one of the amido groups takes up the rest of one molecule of oxalic acid and so forms this new meta-amidotolyloxaminsulfoacid "B." This process is explained by the following equation:

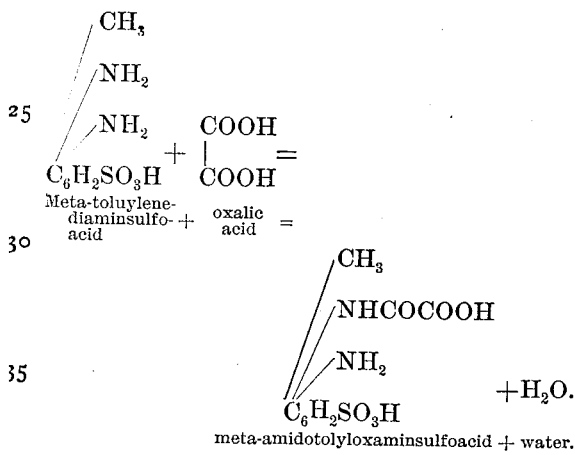

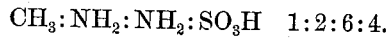
meta-amidotolyloxaminsulfoacid + water.

The meta-toluylenediaminsulfoacid used in this process is the so-called "Schwanert's" acid, of the constitution:

$$CH_3 : NH_2 : NH_2 : SO_3H \quad 1:2:6:4.$$

In carrying out my invention in a practical way I proceed as follows: One hundred parts, by weight, of meta-toluylenediaminsulfoacid, three hundred parts of oxalic acid, and six hundred parts of water are subjected to a temperature of from 90° to 100° centigrade for about twenty-four hours. The mixture is then filtered, and the crystals of meta-amidotolyloxaminsulfoacid produced by this treatment remain on the filter. In order to prepare a chemically-pure product, the crude amido compound so produced may be suspended in water and converted into the calcium salt by means of calcium carbonate. The solution of the calcium salt is then filtered and decomposed by adding muriatic acid. The precipitated meta-amidotolyloxaminsulfoacid is then filtered, pressed, and dried.

This new amido compound is a crystalline powder of a whitish color having a yellowish tinge. It is very little soluble in water, and forms with nitrous acid a diazo compound which is precipitated from moderately-concentrated solutions in crystals. The diazo compound forms, in combination with the so-called "salt R," a dyestuff which dyes wool an orange color. By boiling this new amido compound with a caustic alkali or a strong mineral acid it is decomposed and the original meta-toluylenediaminsulfoacid is formed.

I do not wish to claim anything in this application which is claimed in my application filed April 16, 1900, Serial No. 13,109.

I claim as my invention—

The herein-described new amido compound, meta-amidotolyloxaminsulfoacid "B," of the formula, $$C_6H_2 : CH_3 : NH_2 : NHCOCOOH : SO_3H,$$

derived from meta-toluylenediaminsulfoacid of the constitution $$CH_3 : NH_2 : NH_2 : SO_3H \quad 1:2:6:4,$$

said amido compound being a slightly-colored, crystalline powder, very little soluble in water, being decomposed by boiling with a caustic alkali or strong mineral acid, thus forming the original meta-toluylenediaminsulfoacid, and forming by treatment with nitrous acid a diazo compound which forms in combination with the so-called salt "R" a dyestuff which dyes wool an orange color.

Witness my hand this 13th day of April, 1900.

RICHARD TAGGESELL.

Witnesses:
CYESTA HORNBECK,
JNO. J. BONNER.